United States Patent
Keen

(10) Patent No.: US 6,967,691 B2
(45) Date of Patent: Nov. 22, 2005

(54) COLOR DIFFERENCE SIGNAL PROCESSING

(75) Inventor: Ronald Thomas Keen, Indianapolis, IN (US)

(73) Assignee: Thomson Licensing, Billancourt (FR)

( * ) Notice: Subject to any disclaimer, the term of this patent is extended or adjusted under 35 U.S.C. 154(b) by 532 days.

(21) Appl. No.: 10/214,439

(22) Filed: Aug. 7, 2002

(65) Prior Publication Data

US 2004/0027493 A1 Feb. 12, 2004

(51) Int. Cl.[7] .................. H04N 5/16; H04N 5/18
(52) U.S. Cl. .............. 348/695; 348/692; 348/694
(58) Field of Search ................. 348/692, 697, 348/695, 696, 689, 694, 691; H04N 5/16, H04N 5/18

(56) References Cited

U.S. PATENT DOCUMENTS 5,200,833 A * 4/1993 Suzuki et al. .................. 386/20

5,371,552 A * 12/1994 Brummette et al. ........ 348/697

FOREIGN PATENT DOCUMENTS

| JP | 60171889 | 5/1985 |
| JP | 07203485 | 4/1995 |

* cited by examiner

Primary Examiner—Michael H. Lee
(74) Attorney, Agent, or Firm—Joseph S. Tripoli; Robert D. Shedd; William A. Lagoni

(57) ABSTRACT

A color video display signal processor comprises a source of a color difference signal and an analog to digital converter for converting the color difference signal to a digital signal. A potential divider is coupled to reference voltages of the analog to digital converter for generating a clamp voltage. A clamp arrangement is coupled to the color difference signal and to the analog to digital converter and receives the clamp reference voltage. In response to a clamp pulse the clamp arrangement couples said clamp voltage to said color difference signal.

5 Claims, 2 Drawing Sheets

COLOR DIFFERENCE SIGNAL PROCESSING

A television receiver monitor can accept video input signals of standard definition, having horizontal scanning frequency of 15.734 KHz (1H) or signals of higher definition with a higher scanning frequency of nominally 2.14H or about 33.6 KHz. Standard definition, SD or 1H input signals are processed to enable display at a double scanning frequency of 2H. Higher definition input signals with horizontal scanning frequencies of slightly greater than 2H are processed by analog circuits and then displayed. In this receiver monitor, because the display operates with a scanning frequency in the order of double the standard definition rate, these SD signals require up conversion to form a double frequency scan rate signal prior to display. Typically SD signals are encoded with color information according to the NTSC standard, thus prior to up conversion it is necessary decode the NTSC signal into its luminance and color components which are then digitized to form a digital signal bit stream. This 1H digital bit stream is processed by a de-interlacer, which de-interlaces or up converts the bit stream form a signal for display at a 2H scanning frequency. The resulting double frequency signal is digital to analog converted to form an analog 2H signal for subsequent analog processing and display.

In a display operating with a scanning frequency in the order of double the standard definition rate, standard definition signals require up conversion to enable their display. Such up conversion or de-interlacing is generally performed with analog component signals which are digitized and then de-interlacing and up-conversion. Prior to digitizing the analog component signals are clamped to establish reference potentials which, for example, center the color difference signals within the conversion range of the analog to digital converter. In addition automatic gain control, AGC, is derived from the luminance signal to ensure substantially constant signal amplitudes are coupled for digital conversion. The process of clamping involves charging or discharging a clamp or coupling capacitor for a short time interval during a horizontal (or vertical) blanking interval. The impedance of the signal source, clamping device and the signal amplitude, all influence the charge/discharge process and can result in a small voltage offset or error being introduced in the clamped interval. Clearly when a system employs a succession clamps, with each active during the same time interval, clamping errors will tend to accumulate. Since the color difference signals R-Y, B-Y are added to the luminance signal Y to form red green and blue display drive signals, any offset errors in these signals will produce errors in color rendition, color saturation and affect the color temperature, or white point of the display image. For example, a small positive offset error on both the red and blue color difference signals will produce slightly higher levels for the red and blue drive signals, but a slightly lower level for the green drive signal because green is formed by summing the luminance signal Y with inverted color difference signals (-Pr and -Pb). Thus a color difference clamping arrangement is required that accurately sets the blanking interval to the center of the analog to digital converter range and avoids the introduction of offset errors particularly in systems with cascaded clamps.

BRIEF DESCRIPTIONS OF THE DRAWINGS

DETAILED DESCRIPTION

Figures 1, 2:
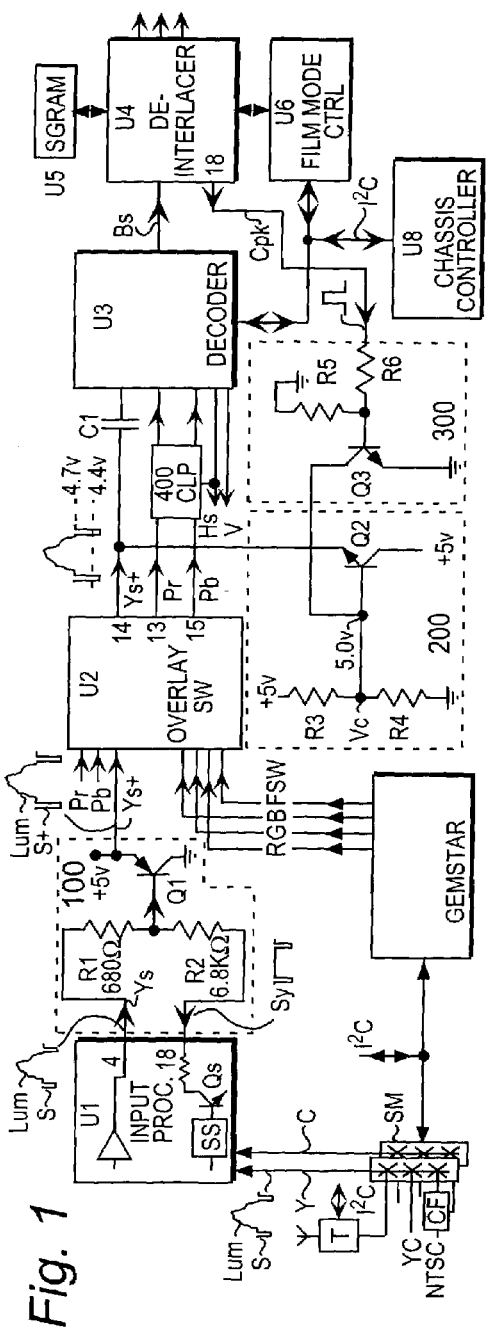
FIG. 1 is a simplified block schematic diagram showing various inventive arrangements in a receiver monitor display.
FIGS. 2(A–E) depicts luminance and color difference signals and their time relationship to various clamp pulses.

FIG. 1, presents a block schematic diagram of a receiver monitor display with scanning frequency up conversion. The display can accept various video input signals of either standard or high definition with a nominal scanning frequency of 1H or nominally 2.14H where standard definition or 1H input signals are processed to enable display at a double frequency rate. Standard definition signals are input to video processor integrated circuit U1, for example Toshiba type TA1276, via a selector matrix SM. Selector SM allows user selection from various sources, for example, a demodulated RF or IF signal, an external Y C component signal comprising luminance and encoded subcarrier, or NTSC encoded signals. The external composite NTSC signal is initially comb filtered to produce separated luminance and encoded subcarrier prior to the selector matrix SM. Thus the SD input to video processor U1 is in the form of luminance and encoded subcarrier components known as YC or S video. Video processor U1 includes a sync separator SS, and an NTSC decoder and matrix arrangement which decodes and forms color difference signals, for example R-Y, and B-Y or Pr and Pb. The luminance or Y signal input is coupled via sync separator SS which provides separated (1H) sync pulses at pin 18 of IC U1. The luminance signal with sync pulses, is output at pin 4 and coupled via an advantageous gated sync pulse stretcher to an overlay switch or matrix switch integrated circuit U2, for example Toshiba type TA1287F.

Video guide information is generated by a Gemstar™ circuit module and is coupled as red, green and blue signals together with a fast switch signal, (FSW), for processing as an on screen display (OSD) by overlay switch IC U2, prior to up-conversion. The switching or mixed superimposition of the Gemstar™ OSD signals is accomplished by IC U2, which in addition, also provides a matrix which converts the GemStar™ originated red green and blue (RGB) OSD signals to luminance and color difference components, for example Y R-Y B-Y, Y Pr Pb, YUV or YIQ.

The outputs from overlay switch IC U2 are coupled via a further advantageous circuitry, which will be described, to a digital decoder, IC U3, for example Samsung type KS0127B. Integrated circuit U3 digitizes the luminance and coloring signals received from overlay switch U2 and forms a data stream conforming to CCIR standard 656. In this receiver monitor display system the master source of horizontal and vertical sync signals is chosen to be sync signals extracted from the luminance signal input to digital decoder U3.

The digitized component signal bit stream (Bs) is coupled to a de-interlacer system comprising a de-interlacing integrated circuit U4, for example Genesis Micro type gmVLX1A-X, and a film mode controller IC U6, for example Genesis Micro type gmAFMC. Integrated circuit U6 is controlled by and communicates with chassis controller U8 via the I²C bus, however communication between IC U4 and IC U6 is via a separate data bus. De-interlacing is initiated within IC U4 which examines the incoming component video data stream to determine the best method for constructing interpolated lines prior to storing each field in a 32 bit SGRAM memory IC U5, for example AMIC type A45L9332. If motion is not detected, the system repeats information from the previous field to provide a complete frame of non-moving video. However, if motion is detected, vertical/temporal filtering is applied using lines and fields around the interpolated line to provide an interpolated signal essentially free of motion artifacts. Film mode controller IC, U6 detects the presence of video signals which originated from 24 Hz film by monitoring motion artifacts for the presence of a cyclical variation occurring at a 5 field rate. This 5 field repetition rate results from a so called 3:2 pull-down telecine process used to form a nominal display rate of 60 Hz by the cyclical duplication of individual fields from the 24 frame per second film original. Thus, having detected film original material the interpolated signal can be assembled with temporally correct lines from a previous field. The resulting 2H scan rate digital video, in the form of three, 8 bit data streams (Y, Cr and Cb) are output from de-interlacing IC U4 and coupled for digital to analog conversion and analog signal processing prior to subsequent display.

Within overlay switch U2 the luminance signal Ys+ is clamped during the back porch interval to a voltage of about 4.7 volts prior to being output at pin 14, as depicted in FIG. 2A. Sync pulse clipping is provided at the emitter electrode of transistor Q2 which is coupled to the junction of IC U2 and coupling capacitor C1 and removes sync amplitude in excess of the nominally standard value. Thus, with the back porch interval of the output luminance signal Ys+ clamped at 4.7 volts, a standard amplitude sync tip should occur at a voltage of about 4.4 volts (4.7–0.286 volts). Thus when the sync pulses at the emitter of transistor Q2 have a potential one Vbe (base emitter voltage) below the clipping voltage at the base of transistor Q2, sync clipping occurs. Thus for nominal sync amplitude a clipping voltage of 5.06 volts is required at transistor Q2 base, and represents the sync tip voltage plus the Vbe of transistor Q2.

Figure 3:
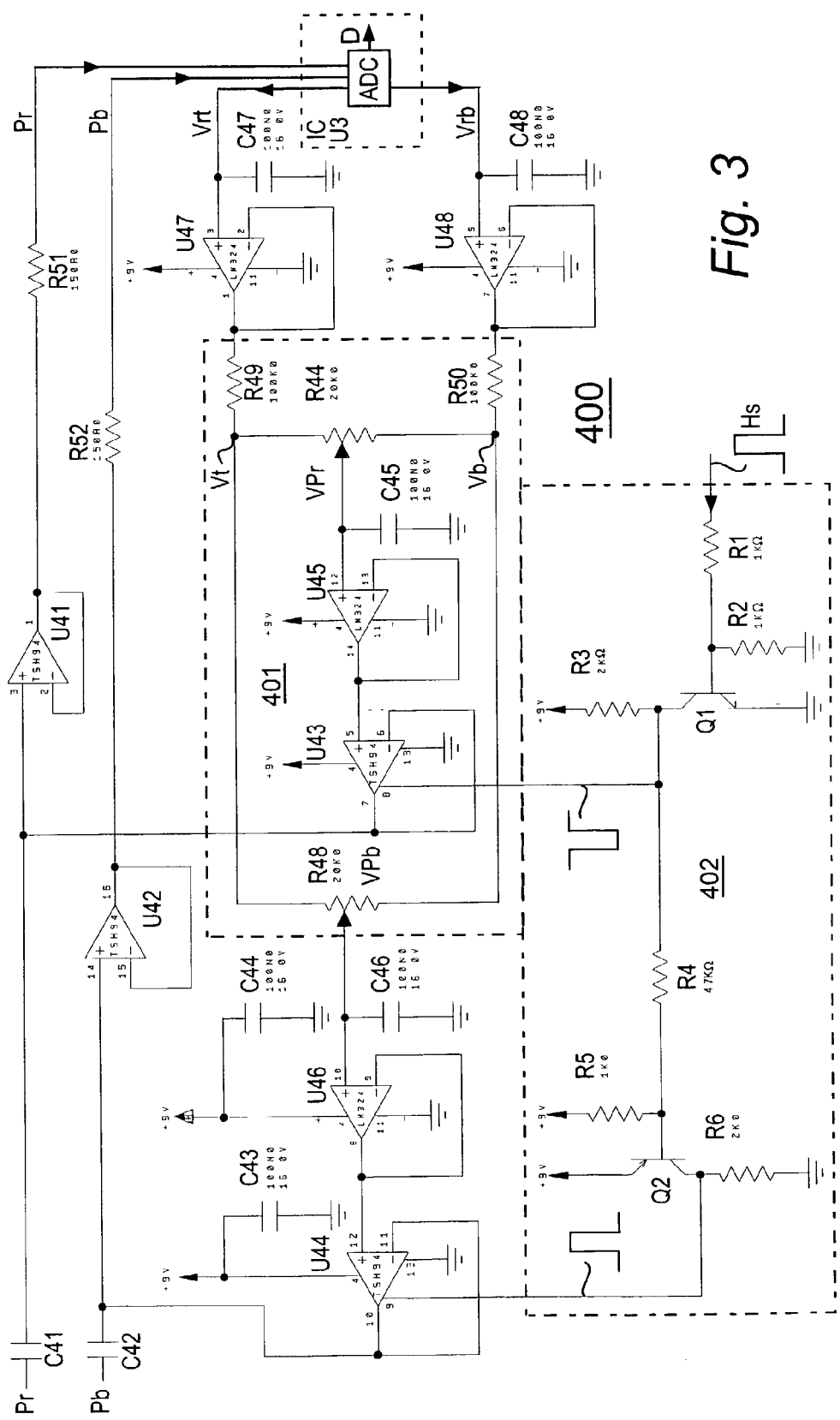
FIG. 3 is a schematic diagram showing in detail various inventive arrangements of block 400 of FIG. 1.

Color difference signals Pr and Pb, depicted in FIGS. 2C, 2D respectively, are output from overlay switch U2 pins 13 and 15 respectively and are coupled to capacitors C41 and C42 of inventive clamp circuit 400, shown in FIG. 3. From capacitors C41 and C42 the color difference signals Pr and Pb are applied to respective non-inverting inputs of integrated circuits U41 and U42, for example ST Microelectronics type TSH94 which are high speed, video frequency, operational amplifiers. Operational amplifiers U41 and U42 are connected as unity gain voltage followers and output respective signals Pr, Pb via series resistors R51, R52 for analog to digital conversion within IC U3. The junctions of input capacitors C41, C42 and the non-inverting inputs of integrated circuits U41 U42 are also connected to an output terminals of two further operational amplifiers U43 U44, for example ST type TSH94, which in addition to video frequency performance also include a disable or stand by function. The disable function is used to turn on operational amplifiers U43 U44 only during a period, t1–t2 of clamp pulse Hs which causes the junctions of capacitors C41 C42 and the non-inverting inputs of integrated circuits U41 U42 to assume the respective voltages at the output of ICs U43 U44. When the clamp pulses are absent, the output of operational amplifiers U43 U44 assume a high impedance which does not discharge the voltages impressed across respective coupling capacitors C41 C42 and present at the inputs of color difference operational amplifiers U41, U42.

Gated operational amplifiers U43, U44 are configured as voltage followers with the non-inverting input of each amplifier connected to the output terminal of further operational amplifiers U45 and U46, for example National Semiconductor type LM324, which are also configured as voltage followers. The non-inverting inputs of voltage follower ICs U45 and U46 are coupled to the wipers of potentiometers R44, Pr clamp reference, and R48, Pb clamp reference. The potentiometers are connected in parallel between voltages Vt and Vb, with each wiper decoupled to ground by capacitors C45, C46 respectively.

Voltages Vt and Vb are sourced via resistors R49, R50 from the output terminals of operational amplifiers U47 and U48, for example National Semiconductor type LM324, configured as voltage followers. The non-inverting inputs of ICs U47 and U48 are decoupled to ground by capacitors C47, C48 respectively and are supplied with reference voltages Vrt and Vrb from an analog to digital converter (ADC) which forms part of decoder IC U3. Voltages Vrt and Vrb are stable reference voltages generated within decoder IC U3 for use in quantizing the analog signal inputs, Ys+, Pr, Pb. Voltage Vrt represents the top or maximum voltage applied to the analog to digital converter and similarly voltage Vrb represents the bottom or minimum voltage applied as references for quantization within the analog to digital converter. For example, since coloring signals Pr, Pb are symmetrically disposed about a zero color axis, the quantizer voltages Vrt and Vrb can be of equal but opposite values. FIGS. 2A, 2C and 2D depict analog component signals, and as described these signals are clamped to establish reference potentials prior to digital conversion. For example, conventionally the luminance signal component Ys+ is clamped to reference value to bring the blanking intervals of the signal to a voltage value required or determined by the analog to digital converter (ADC) as representing an essentially zero luminance or black level signal, ignoring any setup signal or pedestal component. Typically luminance signal clamping occurs during the back porch period (t2–t5) of the horizontal blanking interval (t0–t5) as shown in FIG. 2A and can employ a clamp pulse timed as depicted by clamp pulse Bpc of FIG. 2B. In an exemplary luminance signal having a picture to sync ratio of 100:40 IRE the blanking or black level clamp voltage has a value represented by the ratio 40/140 of the difference between ADC reference voltages Vrt and Vrb applied across the ADC quantizer. This scaled reference value is readily accessed and provided to a luminance clamp within decoder IC U3.

Similarly color difference signals Pr and Pb of FIGS. 2C and 2D, require their respective blanking intervals (t0–t5) clamping to a specific voltage value required by the color difference signal analog to digital converters (ADCs). Color difference signals Pr and Pb have bipolar analog values, symmetrically displaced about a blanking or zero color difference value. Thus, the blanking periods of signals Pr and Pb, t0–t5 are required to be set to the ADC reference voltage corresponding to the zero color difference value. This zero color difference value represents the center of the range of ADC digital values D, and therefore the center of the ADC reference voltages Vrt and Vrb applied across the ADC quantizer of U3. However, unlike the luminance signal, which is clamped within decoder IC U3, because signals Pr and Pb are clamped external to the integrated circuit, the required center ADC reference voltage clamping potential is not available outside the IC. As a consequence an advantageous active potential divider arrangement 401 formed by voltage followers U47, U48, and resistors R49 and R50 and variable resistors R48 and R44 generates from the stable converter reference voltages the required center reference voltage of, for example, (Vrt–Vrb)/2. Although analog color difference signals Pr, Pb have bipolar values that range about the center of the ADC reference voltage supply, potentiometers R48 and R44 provided a nominal few percent of voltage adjustment to compensate for any output offset voltages from voltage followers U41, U42.

Typically luminance signal clamping occurs during the back porch period of the horizontal blanking interval as depicted in FIGS. 2A, 2B. Often it is convenient to employ the same luminance timed, back porch clamp pulse Bps for clamping the color difference signals Pr, Pb. However, in a display system where color difference signals may be clamped in multiple successive processing stages any residual clamp error voltages, resulting from previous clamping actions will tend to accumulate producing an undesirable and erroneous display image coloration. Thus in a further advantageous arrangement, color difference signals Pr, Pb are clamped to the ADC derived center reference voltage (Vrt–Vrb)/2 by a clamp pulse Hs timed to occur during the period t1–t2. Clamp pulse Hs is processed by amplifiers 402 and generated within decoder IC U3. Clamp pulse Hs is substantially coincident with the horizontal synchronizing signal derived from the luminance signal Ys+. Because this advantageous clamp pulse Hs occurs substantially coincident with the horizontal sync, this part of the horizontal blanking interval of the color difference signals is unlikely to have been subject to prior back porch clamp circuit errors or offsets. Thus, a clean or non-clamped signal interval is chosen for clamping and the introduction or propagation of previous erroneous clamping potentials is prevented from unbalancing the color difference signals and causing inaccurate color rendition.

In FIG. 3 a positive clamp pulse Hs, derived from separated horizontal sync (S+), is applied to pulse amplifiers 402. Clamp pulse Hs is coupled to the base of transistor Q1 from the junction of resistors R1, R2 which potentially divide the amplitude of clamp pulse signal Hs. The emitter of transistor Q1 is connected to ground with the collector connected to a positive voltage supply via resistor R3. The collector of transistor Q1 is coupled to the disable or stand-by terminal of operational amplifier U43 such that a positive collector voltage maintains the amplifier in a high output impedance, stand by condition. However, when pulse Hs is present, transistor Q1 turns on causing the collector voltage to fall, from the positive supply voltage, to nominally ground potential replicating an inverted version of input pulse Hs. Thus, during pulse Hs, a nominally ground potential is applied to the stand-by terminal of amplifier U43 which turns on forcing the junction of capacitor C41 and the input of the red color difference amplifier U41 to assume the voltage VPr coupled from voltage follower U45.

The collector of transistor Q1 is also coupled the base electrode of transistor Q2 via the junction of resistors R4, R5 which potentially divide the inverted clamp pulse signal. The emitter of transistor Q2 is connected to the positive voltage supply and the collector connected to ground via resistor R6 and to the disable or stand-by control terminal of operational amplifier U44. During the absence of clamp pulse Hs, the collector of transistor Q1 has a voltage nominally that of the positive supply which turns off transistor Q2. With transistor Q2 cut off the collector has a nominally ground potential which is coupled to the stand-by terminal and produces a stand-by condition in operational amplifier U44. The presence of a negative pulse at the collector of transistor Q1 causes transistor Q2 to turn on and apply a positive voltage to the stand-by terminal of operational amplifier U44. Thus clamp pulse Hs turns on amplifier U44 and forces the junction of capacitor C42 and the input of the blue color difference amplifier U42 to assume the voltage VPb coupled from voltage follower U46.

Thus by clamping the color difference signals during the horizontal sync interval, t1–t2, of horizontal blanking interval t0–t5, the presence of erroneous prior clamp voltages or offsets are avoided and proper color rendition is achieved by ensuring that the color difference signals supplied for analog to digital conversion are clamped to potential representing the center digital range reference voltage derived from the analog to digital converter.

What is claimed is:

1. A color video display signal processor comprising:
   a source of a color difference signal;
   a source of a luminance signal;
   a source of a first clamp pulse occuring during a first timing interval;
   a source of a first clamp reference;
   a source of a second clamp pulse occuring during a second timing interval;
   a source of a second clamp reference; and
   a clamp means coupled to said color difference signal and to said luminance signal and receiving said first and said second clamp pulses wherein response to said first clamp pulse said clamp means couples said first clamp reference to said color difference signal and wherein response to said second clamp pulse said clamp means couples said second clamp reference to said luminance signal, and wherein said first timing interval and said second timing interval are different timing intervals.

2. The display signal processor of claim 1, wherein said second clamp pulse is generated substantially coincident with a horizontal back porch interval.

3. The display signal processor of claim 1, wherein said color difference signal is capacitively coupled from said source.

4. The display signal processor of claim 1, wherein said clamp means comprises a gated operational amplifier.

5. The display signal processor of claim 1, wherein said first clamp pulse is generated substantially coincident with a horizontal sync pulse.

* * * * *